Dec. 15, 1931.  C. C. McBRIDE  1,836,079

CLINOMETER

Filed June 19, 1928

INVENTOR.
Charles Corliss McBride
BY
Francis C. Huebner
ATTORNEY.

Patented Dec. 15, 1931

1,836,079

UNITED STATES PATENT OFFICE

CHARLES CORLISS McBRIDE, OF SANGER, CALIFORNIA

CLINOMETER

Application filed June 19, 1928. Serial No. 286,644.

My invention relates to a clinometer.

The objects I have attained in the present invention are a device of the character described which is simple in construction, accurate in indicating the degree of incline from a fixed base line, which will maintain a steady position and not unduly oscillate, which can be readily read, and which can easily be attached to a vehicle, aeroplane, submarine, or other moving device.

Figure 1:
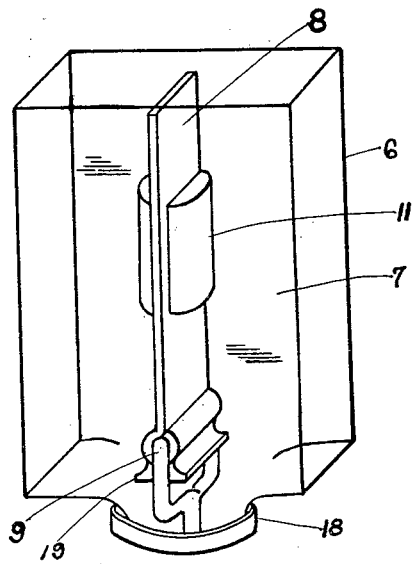
Figure 2:
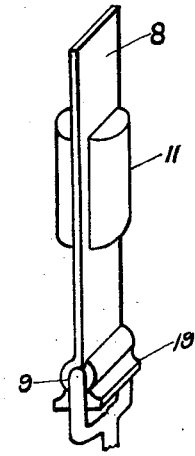
Figure 3:
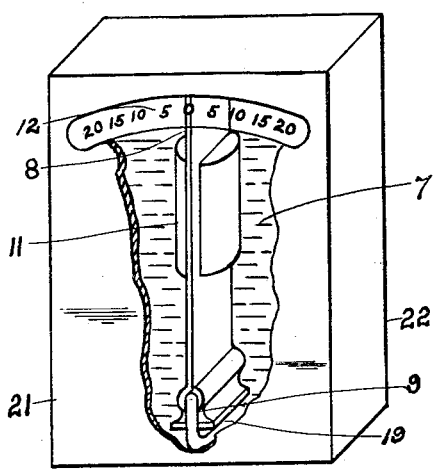
Figure 4:
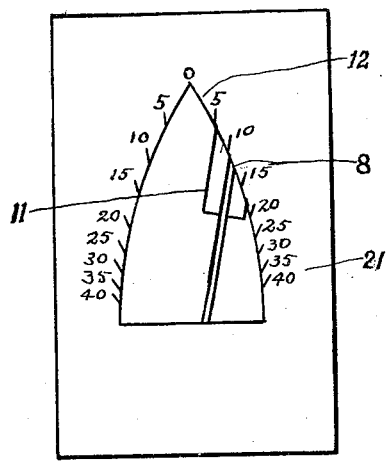

These and other objects are accomplished by means of the device hereinafter described and illustrated in the accompanying drawings, in which Fig. 1 is a perspective view of the clinometer having a transparent container adapted to show the interior mechanism of my invention. Fig. 2 is a view of the indicating blade of the device. Fig. 3 shows a perspective of the clinometer from the scale side, showing a portion of the scale readable in connection with the indicating blade and having parts of the case cut away. Fig. 4 is a view of the front face of the device showing a novel arrangement of the scale thereon.

Referring to the drawings, I have used a container 6 which is adapted to hold liquid, and have filled the container with a viscous liquid 7. Glycerine would be a suitable liquid therefor. This container can be a transparent bottle as shown in Fig. 1, in which the bottle is inverted. The container has a base 18 which has a fixed position with relation to the container. As shown in Fig. 1, this base can consist of a cork or cap 18 which forms a closure for the container.

An indicating blade 8 is hinged to the base 18 by hinge 9. The blade 8 is preferably formed of a flat strip and the hinge 9 adapts the blade to be moved radially on a plane, at right angles to the flat side of the blade. To the under part of the blade is a counterweight or balancing weight 19, which weight tends to assist the blade to maintain a vertical position. Between the hinge and the upper end of the blade I have attached a float 11 which can be constructed of material having a specific gravity less than the liquid within the container, or be formed of airtight chambers which are made integral or independent of the blade. It is here noted that the air chamber can be dispensed with if the counterweight is sufficient to normally hold the blade upright. The combination of the counterweight and float is the preferred.

The case 22 is adapted to hold the container 6. On the reading face 21 of the case, which of necessity should be on a plane at approximately right angles to the flat side of the indicating finger, I have placed a fixed scale 12. This scale can be formed of two lines extending obliquely to a converging point at the approximate center vertical line of the container. These lines can be straight or curved. The scale with the figures 0, 5, 10, 15, 20 and 25 is adapted to show the degree of declination from the vertical when the device is positioned on a vehicle or other object subject to varying declinations, so that the blade registers at 0 when the object to which it is attached is on a level. The object attained by forming the scale in the shape of an approximate Gothic arch or triangle is to have a larger space for reading matter and indicating numbers, and to more easily read slight variations than is possible with the same size of device when the scale is formed as an arc of a circle as is the common practice at the present time.

It is here noted that the essentials of my invention are the closed container, filled with viscous liquid, a flat blade hinged at the bottom and adapted to normally maintain a vertical position within the container, and a scale adapted to be read with the changes of level of the base line of the container. The fact that the chamber is full of viscous liquid dispenses with wave or surging movements of the liquid in the varying movements of the container which would influence the movement of the blade. The fact that the indicating blade is flat and the contents of the container is a viscous liquid will give the indicating blade a steady movement which holds the blade in a vertical position without vibration or undue oscillation. It is also noted that the completed device can be formed compact and have a wide range of declinations. It is further noted that if the liquid within the container is subjected to pressure when the container is sealed, it would add to the accuracy of the finished device.

Having described my invention, I claim:

1. A clinometer consisting of a container adapted to contain liquid and being approximately filled with a viscous liquid, a flat blade, means hingedly mounting said blade within the said container for swinging only in a plane approximately at right angles to the surface of the blade, a float attached to the blade between the ends thereof, and means associated with the container bearing a scale adapted to be read in cooperation with the edge of the blade.

2. A clinometer consisting of a closed container approximately filled with viscous liquid, a flat blade hinged to a fixed base within the container and attached thereto, the blade being adapted to swing in a plane only at right angles to the flat surface of the blade, means for holding the blade normally vertically within the container consisting of a float attached to the blade between the ends thereof, and a counterweight attached to the blade and depending below the hinge, and means associated with the container bearing a scale adapted to be read in cooperation with the relative position of the container in relation with a vertical line indicated by said blade.

3. A clinometer consisting of a closed container adapted to contain a liquid and approximately filled with a viscous liquid, a flat blade hinged to a fixed base adjacent to the bottom of the container normally extending vertically within the container, and adapted to be moved on said hinge in a radial plane at right angles only to the flat sides of the blade, said container having a scale thereon readable in cooperation with position of the blade relative to a base line of the container.

4. A clinometer consisting of a closed container filled with viscous liquid, a flat blade hingedly mounted on a fixed base at the bottom of the container said blade being adapted to normally maintain a vertical position within the container, and adapted to move on said hinge in a radial plane at right angles to the flat sides of the blade, said container having a scale thereon readable on the variations of a fixed base line of said container relative to the vertical position of the blade, said scale being arranged in the line of two arcs converging at the top at a point aligned with the blade when the said base line is on a horizontal, and spaced apart at the bottom.

CHARLES CORLISS McBRIDE.